(12) United States Patent
Biswas et al.

(10) Patent No.: US 11,052,633 B2
(45) Date of Patent: Jul. 6, 2021

(54) HONEYCOMB CORE WITH IMPROVED ACOUSTIC PROPERTIES AND METHOD FOR MAKING SAME

(71) Applicant: SAFRAN CABIN INC., Huntington Beach, CA (US)

(72) Inventors: Bhaskar Biswas, Bothell, WA (US); Matthew Taylor, Bothell, WA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 0 days.

(21) Appl. No.: 16/341,036

(22) PCT Filed: Mar. 28, 2019

(86) PCT No.: PCT/US2019/024576
§ 371 (c)(1),
(2) Date: Apr. 10, 2019

(87) PCT Pub. No.: WO2019/221828
PCT Pub. Date: Nov. 21, 2019

(65) Prior Publication Data
US 2021/0060892 A1   Mar. 4, 2021

Related U.S. Application Data (60) Provisional application No. 62/673,018, filed on May 17, 2018.

(51) Int. Cl.
*B29C 44/18*   (2006.01)
*B29L 31/60*   (2006.01)
(Continued)

(52) U.S. Cl.
CPC .............. *B32B 3/12* (2013.01); *B29C 44/186* (2013.01); *B29C 66/7254* (2013.01);
(Continued)

(58) Field of Classification Search
CPC ..... B29C 44/18; B29C 44/186; B29C 44/188; B29C 66/72525; B29C 66/7254;
(Continued)

(56) References Cited

U.S. PATENT DOCUMENTS 2,744,042 A * 5/1956 Pace ..................... F16L 59/029
264/46.5
3,920,587 A * 11/1975 Watkinson ............. C08J 9/0061
521/111
(Continued)

OTHER PUBLICATIONS

International Search Report and Written Opinion issued in PCT/US19/24576.

*Primary Examiner* — Michael A Tolin
(74) *Attorney, Agent, or Firm* — Jeffer Mangels Butler & Mitchell LLP; Brennan C. Swain, Esq.

(57) ABSTRACT

A method for providing a honeycomb core assembly that includes obtaining a honeycomb core having at least first and second cells that each define a cell interior having an open bottom and an open top, contacting the honeycomb core with a liquid foaming adhesive, contacting a hardening agent with the liquid foaming adhesive, and allowing the hardening agent and liquid foaming adhesive to react to harden and form a first barrier member that spans the cell interior of the first cell and a second barrier member that spans the cell interior of the second cell, thereby forming the honeycomb core assembly.

15 Claims, 7 Drawing Sheets

(51) Int. Cl.
  *B32B 3/12* (2006.01)
  *B64D 33/02* (2006.01)
  *F02C 7/045* (2006.01)
  *G10K 11/172* (2006.01)
  *B32B 7/12* (2006.01)
  *B32B 37/12* (2006.01)
  *B29C 65/00* (2006.01)
  *B29D 99/00* (2010.01)

(52) U.S. Cl.
  CPC ............ *B29D 99/0089* (2013.01); *B32B 7/12* (2013.01); *B32B 37/12* (2013.01); *B29L 2031/608* (2013.01); *B32B 2266/14* (2016.11); *B32B 2307/102* (2013.01); *B64D 2033/0206* (2013.01); *F02C 7/045* (2013.01); *G10K 11/172* (2013.01)

(58) Field of Classification Search
  CPC ............ B29D 24/005; B29D 99/0089; B29L 2031/608; B32B 3/12; B32B 3/266; B32B 5/20; B32B 7/12; B32B 37/12; B32B 37/146; B32B 2264/10; B32B 2264/102; B32B 2264/1022; B32B 2264/104; B32B 2264/105; B32B 2264/1052; B32B 2264/1056; B32B 2266/14; B32B 2305/022; B32B 2305/024; B32B 2307/10; B32B 2307/102; B32B 5/18; B32B 15/14; B32B 15/20; B32B 27/12; B32B 27/281; B32B 27/285; B32B 29/02; B32B 2250/03; B32B 2250/40; B32B 2255/12; B32B 2255/205; B32B 2255/26; B32B 2266/0207; B32B 2266/0242; B32B 2266/0271; B32B 2266/0278; B32B 2266/0285; B32B 2307/732; B32B 2605/08; B32B 2605/18; B64D 2033/0206; F02C 7/045; G10K 11/172

See application file for complete search history.

(56) References Cited

U.S. PATENT DOCUMENTS

| | | | | |
|---|---|---|---|---|
| 3,970,324 | A | * | 7/1976 | Howat ..................... A63C 5/12 |
| | | | | 280/610 |
| 4,265,955 | A | * | 5/1981 | Harp .................... B29D 24/005 |
| | | | | 428/116 |
| 5,164,260 | A | * | 11/1992 | Yoshinaka ............... C08K 7/08 |
| | | | | 428/328 |
| 9,127,452 | B1 | * | 9/2015 | Winfield ................. B32B 5/022 |
| 9,741,331 | B1 | | 8/2017 | Alam |
| 2011/0079338 | A1 | | 4/2011 | Take |
| 2013/0341119 | A1 | | 12/2013 | Chihashi |
| 2014/0367512 | A1 | | 12/2014 | Dean |
| 2015/0273788 | A1 | | 10/2015 | Sugihara |
| 2015/0290920 | A1 | | 10/2015 | Rohr |

* cited by examiner

HONEYCOMB CORE WITH IMPROVED ACOUSTIC PROPERTIES AND METHOD FOR MAKING SAME

CROSS REFERENCE TO RELATED APPLICATIONS

This application is a national stage application, filed under 35 U.S.C. § 371, of International Patent Application No. PCT/US19/24576 filed Mar. 28, 2019, which claims the benefit of U.S. Provisional Application No. 62/673,018 filed May 17, 2018, the entireties of which are incorporated herein by reference.

FIELD OF THE INVENTION

The present invention relates generally to honeycomb core, and more particularly to honeycomb core with improved acoustic properties and methods for making same.

BACKGROUND OF THE INVENTION

Honeycomb cores are widely used for producing panels, such as sandwich panels, where the core is sandwiched in the middle between fabrics or other material for producing stiff composite panels. Composites are well known for their strength-to-weight properties, and are widely used for aviation and aerospace applications. However, there are other applications where sandwich panels are used, for example applications in automobile, industrial, space, etc. As issue with honeycomb core is that they easily allow noise therethrough.

SUMMARY OF THE PREFERRED EMBODIMENTS

In accordance with a first aspect of the present invention there is provided a method for providing a honeycomb core assembly that includes obtaining a honeycomb core having at least first and second cells that each define a cell interior having an open bottom and an open top, contacting the honeycomb core with a liquid foaming adhesive, contacting a hardening agent with the liquid foaming adhesive, and allowing the hardening agent and liquid foaming adhesive to react to harden and form a first barrier member that spans the cell interior of the first cell and a second barrier member that spans the cell interior of the second cell, thereby forming the honeycomb core assembly. In a preferred embodiment, the method includes inserting the honeycomb core into a bath of liquid foaming adhesive that has a top surface that is located below a top surface of the honeycomb core and the method includes disposing the hardening agent into the cell interiors of the first and second cells and on the top surface of the bath of liquid foaming adhesive. The method also preferably includes the step of mixing a catalyst with the hardening agent (so that hardening can take place with or without heat) and/or applying heat to the hardening agent and liquid foaming adhesive. The method can include contacting a mixture of a hardening agent and a catalyst with the liquid foaming adhesive and then applying heat to the mixture of the hardening agent, catalyst and liquid foaming adhesive.

In a preferred embodiment, the method includes removing the honeycomb core assembly from the bath of liquid foaming adhesive, and inserting the honeycomb core assembly into a water bath to remove any foaming adhesive residue under the first and second barrier members. The method can also include applying a vacuum through the open tops of the first and second cells to remove any excess catalyst and hardening agent within the cell interiors. The liquid foaming adhesive can include a noise suppressing chemical therein and/or the method can include coating the honeycomb core with a noise suppressing chemical.

In a preferred embodiment, the method includes forming at least one perforation in the first barrier layer and forming at least one perforation in the second barrier layer. This can be done by positioning at least first and second perforating members in the bath of liquid foaming adhesive. The first and second perforating members extend upwardly above the top surface of the liquid foaming adhesive. After the honeycomb core is inserted into the bath of liquid foaming adhesive, the first perforating member is located in the cell interior of the first cell and the second perforating member is located in the cell interior of the second cell. The first perforating member forms a first perforation in the first barrier member and the second perforating member forms a second perforation in the second barrier as the barrier member hardens.

In accordance with another aspect of the present invention there is provided a honeycomb core assembly produced by any or all of the method steps discussed herein.

Honeycomb cores are produced from paper ribbon that are bonded and then coated. The bond between the papers are known in the art as node lines. Once the paper ribbons are bonded at the node lines, which creates a stack, the stack of paper ribbons are stretched to form a structure containing multiple cells. The entire structure is then coated with resin and cured to make structure a rigid.

Primary constituents of the honeycomb core are paper, adhesive and resin. The papers are printed with node bond adhesive thereon with a gap to be maintained between nodes for forming the cell geometry. Once the paper is printed with the node lines, the printed papers are stacked aligning the printed node lines and then pressed to bond the papers. The bonded stacked paper is referred to herein as HOBE (HOneycomb Block unexpanded). Upon bonding, the bonded HOBE is stretched in a linear direction from both paper face sides of the HOBE to form the cells of the honeycomb, and heat set to ensure the elongated structure of the honeycomb core. Following this, the stretched honeycomb core is coated with resin, and cured to produce rigid honeycomb core. The honeycomb cores are then sliced as per the required thickness for the application. The rigid honeycomb cores can then be used for sandwich panels.

Honeycomb cores can be used for producing structures because the cores impart stiffness to the structures. Honeycomb cores are commonly used for sandwich panels, where the honeycomb core is in the middle and sandwiched from both sides in the z-direction by fabrics or other material for producing stiff composite panels. Composites are well known for their strength-to-weight properties, and are widely used in the aviation industry for aerospace applications. Sandwich panels are also used in other industries, for example, in the automobile, industrial, and space industries.

The present invention includes the use of noise suppressing chemicals and foaming adhesive (with or without noise reducing capability) on honeycomb core as a noise blocker by making a barrier within the honeycomb cells. This acts as a mode of building the noise insulation properties of the honeycomb. In particular, the inventive panels can be used on commercial passenger aircraft. However, this is not a limitation on the present invention.

In the present invention, honeycomb core is used where acoustic or reduction of noise levels is required or desired. The focus of the invention is to include a barrier of foaming adhesive within the core to prevent or reduce the amount of sound passing therethrough. The foaming adhesive can also be modified by adding noise suppressing chemicals thereto. It will be appreciated by those of ordinary skill in the art that the weight of the barrier of foaming adhesive can be controlled by controlling the thicknesses.

The base honeycomb core includes bonded papers coated with resin. The papers can be, for example, DuPont Nomex or Kevlar papers (or similar materials) of different thickness. The thickness of the paper can vary between about 0.0001 inch to about 0.1000 inch, more precisely from about 0.0005 inch to about 0.0100 inch, and most precisely from about 0.0010 inch to about 0.005 inch in thickness. The resin used for node bonding can be a thermoset, thermoplastic or elastomeric resin. The resin used for coating the bonded honeycomb papers can be any adhesive that is typically used for coating honeycomb papers.

The honeycomb core includes a barrier in the middle for noise reduction. The noise reduction can be achieved by coating the honeycomb core with noise suppressing chemicals such as Ferrous-Silicon alloy powder or Ferrous-Silicon-Aluminum alloy powder or similar, ferrite or titanium oxide or calcium titanium oxide or Strontium Titanate powder, ferrite, sendust or something similar.

The foaming adhesive that is preferably used for making the barrier can be any medium based, such as water based foaming adhesive. The film formation or barrier formation from the foaming adhesive is possible through cross linking either using heat application or mixing reactive catalyst/activator or both. Any medium based foaming adhesive, preferably water based foaming adhesive, can be used. The foaming adhesives are comprised of epoxy, phenolic, polyurethane, acrylics, rubber or similar chemicals or a combination of these chemicals. For example, the foaming adhesive can be from 3M, Henkel, Huntsman or Hexcel or from any supplier.

The foaming adhesive can be modified by adding noise suppressing chemicals. for example, liquid foaming adhesive can be mixed with noise suppressing chemicals by shear mixing or by any mixing process. The loading of the noise suppressing chemicals varies from very low percentage, e.g., 0.00001% to 100%, more preferably from 0.0001% to 90%, more preferably 0.001% to 80%, more preferably 0.01% to 70%, more preferably 0.1% to 60% or more preferably 1% to 50%.

As will be appreciated, the reduction of the noise level can be higher if the barrier of the foaming adhesive is higher or exposed to higher noise suppressing chemicals. Thickness of the foaming adhesive depends upon the time for building the barrier, reactivity of the chemicals, rate of crosslinking of the foaming adhesive, accelerated temperature, etc. A higher level of noise suppressing chemicals can be obtained by spraying them on the honeycomb surface, coating them on the honeycomb surface or foaming adhesive barrier's surface or by adding higher loading in the foaming adhesive. It is possible to spray or coat the noise suppressing chemicals on the surface of the panels made from the honeycomb. Furthermore, the barrier of foaming adhesive can be applied or disposed anywhere within the hollow sections of the honeycomb core, just outside the honeycomb core or within or outside of the face sheets of the panel made from the honeycomb core.

Furthermore, the honeycomb core can be made of either Nomex, Kevlar or any paper, or aluminium or any metal, or thermoplastics, etc. Thus, the present invention combines a honeycomb core, foaming adhesive and noise suppressing materials of different types or different grades to produce an acoustic core assembly and can be used where sound insulation may or may not be required.

Thus this invention will exploit the honeycomb core, foaming adhesive or any adhesive and noise suppressing materials of different types or different grade to produce acoustic honeycomb core, and fit for the application of acoustic panels, or where sound insulation may not be required. Hence, the drive of the invention is to produce honeycomb core which reduces the noise level traveling through the composite panels made from the honeycomb core.

The formation of the barrier with the adhesive or foaming adhesive can be done in any type or dimension of core cell. For example, it is possible within hexagonal cells, over expanded cells or any other shaped of cell. Also, there is no limitation on cell size, the barrier formation can be done within the smallest size cells to largest size cells. It is also possible to adjust the height of the barrier or foaming adhesive within the honeycomb core cell. Thus, it is possible to adjust the resonance level from the noise insulation. It is possible to adjust the thickness of the barrier or adhesive or foaming adhesive within the honeycomb core cells. It is possible to vary the thickness of the film. In another embodiment, the barrier, adhesive or foaming adhesive can be flexible. Preferably, the elastic modulus of the barrier can withstand any stretch or expansion typically encountered by honeycomb core. Preferably, the elastic modulus is lower, so that it will be more flexible. It is preferred to be less than 1 GPa (giga pascal), more preferably less than 0.1 GPa, more preferably less than 0.01 GPa, and most preferably less than 0.001 GPa. It is preferred that the elastic modulus is more than 1 Pa (Pascal), and preferably more than 1 kPa (Kilo Pascal).

Furthermore, the barrier of adhesive or foaming adhesive can be perforated where the number of perforations can be at least one depending upon the cell dimensions. The perforation size can be varied from 0.001 inch to the maximum cell width. The perforation of the barrier can be used to create an acoustic resonator where the number and size of the perforated holes along with the thickness and height of the barrier within the cell can be adjusted to meet the requirement of acoustic performance. The perforation process can include the use of a staged bed of erected nails or needles or pins during curing of the barrier of adhesive or foaming adhesive and then removing the staged bed after curing of the adhesive. Alternatively, the perforations can be created by using a tool to punch the perforations, lasers or needles can also be used. Any process for perforating the barrier member after formation of the barrier member can be used. Furthermore, this invention can be automated to produce acoustic honeycomb core faster and also it can be a continuous automated production process.

The present invention includes honeycomb core with sound insulation properties and/or honeycomb core with a barrier/sound blocker in the hollow section(s) of the cell(s). It will be appreciated that honeycomb core with the barrier can be used to replace septumized honeycomb cores or the bonded honeycomb cores and/or panels made from the septumized core. Since there is no bonding of two core sheets, or it is just made of a single core sheet without any bonding, the mechanical strength of the core is comparatively higher than the septumized or bonded cores. The uses of honeycomb core with a barrier in the center allows reduction of process time in the production for producing panels for acoustic applications. The spray or coating of noise suppressing chemical on the honeycomb core reduces the level of noise. The spray or coating of noise suppressing chemicals on the barrier within the honeycomb core cells reduces the level of noise. The barrier for noise reduction can be made either of foaming adhesive on its own or of noise suppressing materials or of mix of foaming adhesive and noise suppressing materials. The barrier of noise suppressing materials can be within or outside of the cells of honeycomb core. The thickness of the barrier can vary from a very thin or light weight barrier to a thicker or higher weight barrier. The manufacturing of this type of honeycomb core for acoustic panel formation can be done for any honeycomb core, for example—Nomex, Kevlar, Paper, aluminium or any metal core or for any core made from thermoplastic material (e.g. Polyetherimide, PEI). The barrier within the honeycomb core cell can be formed by a fusion bonding process as well.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 1:
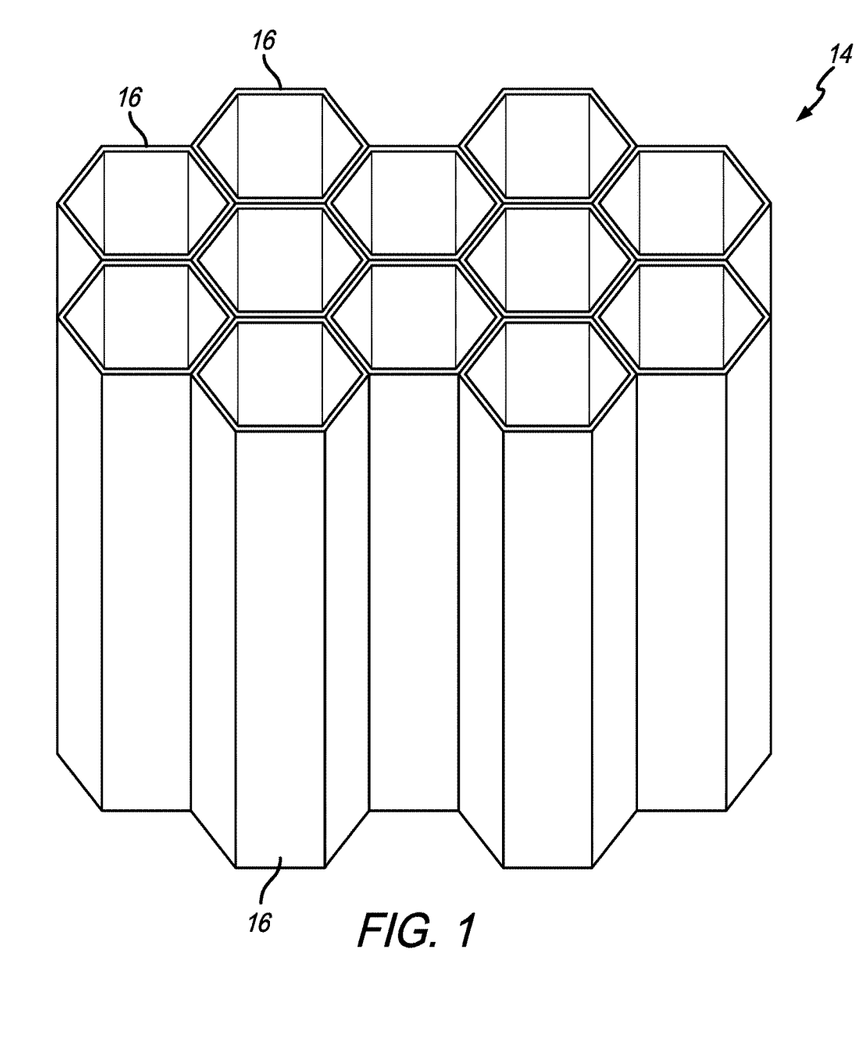
FIG. 1 is a perspective view of a honeycomb core prior to addition of a barrier member therein.
Figure 2:
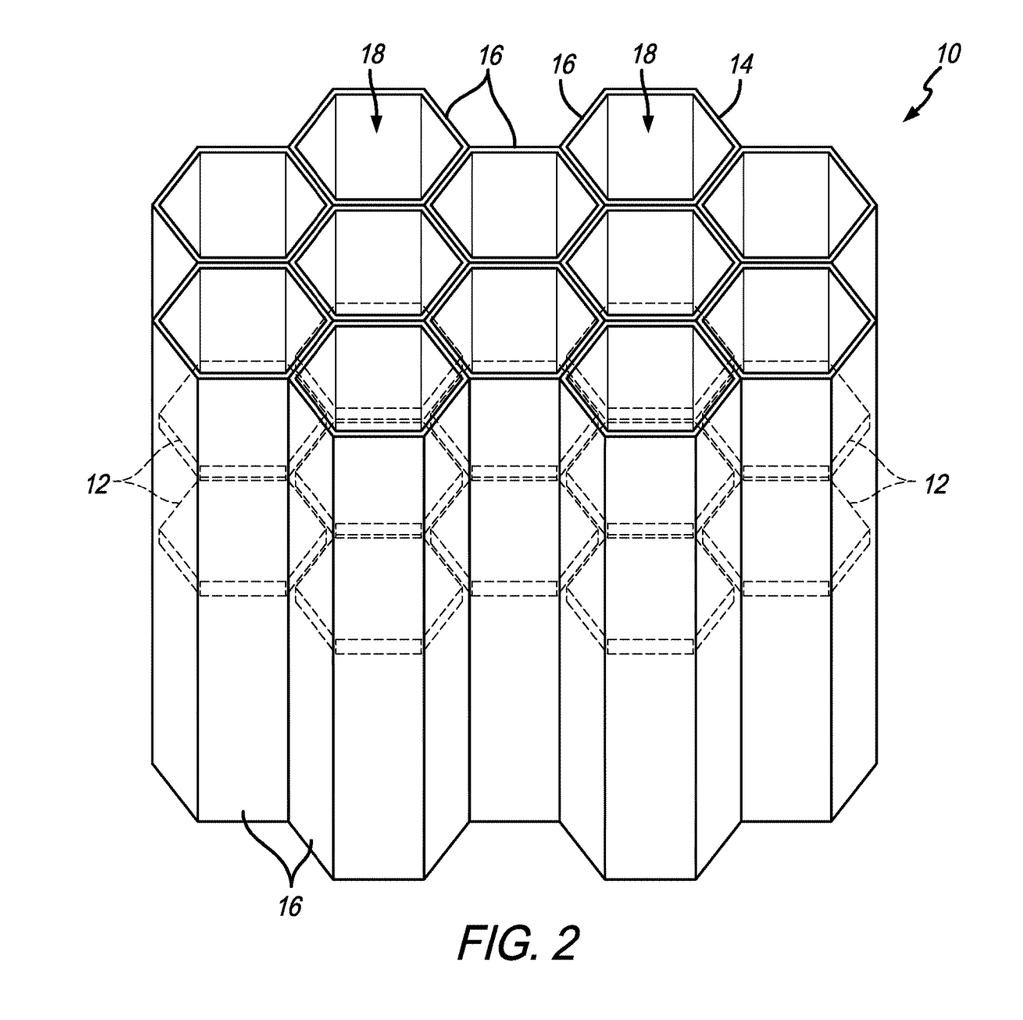
FIG. 2 is a perspective view of a honeycomb core assembly in accordance with a preferred embodiment of the present invention.
Figure 3:
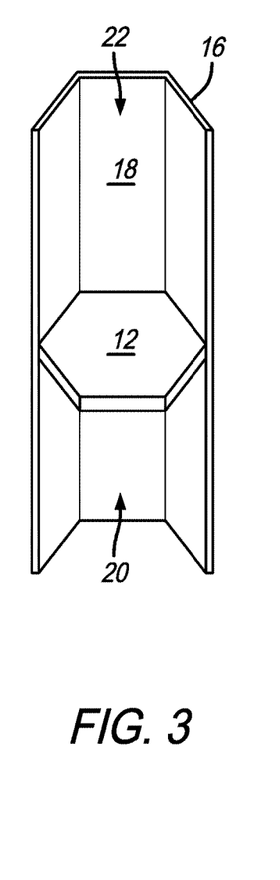
FIG. 3 is a perspective view of a single cell of the honeycomb core assembly of FIG. 2 with a portion of the cell walls cut away.

Referring now to the drawings, wherein the showings are for purposes of illustrating the present invention and not for purposes of limiting the same, FIGS. 1-15 show a process for producing a honeycomb core assembly 10 that includes an acoustic barrier member 12 therein. FIG. 1 shows a honeycomb core 14 that includes a plurality of cells 16 that each include a wall that defines a cell interior 18 that includes an open bottom 20 and an open top 22. FIG. 1 shows a hollow individual cell 16. This is essentially the state of the honeycomb core before the process for adding the barrier members 12. FIG. 2 shows the finished honeycomb core assembly 10 after the barrier members 12 have been added within the cells 16. FIG. 3 shows an individual cell 16 with the barrier member 12 therein.

Figure 4:
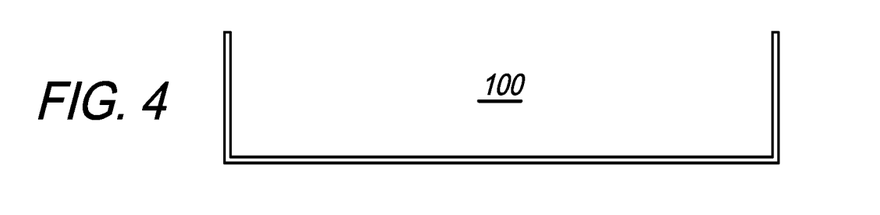
FIG. 4. shows an empty container used in a process for producing the honeycomb core assembly of FIG. 2.
Figure 5:
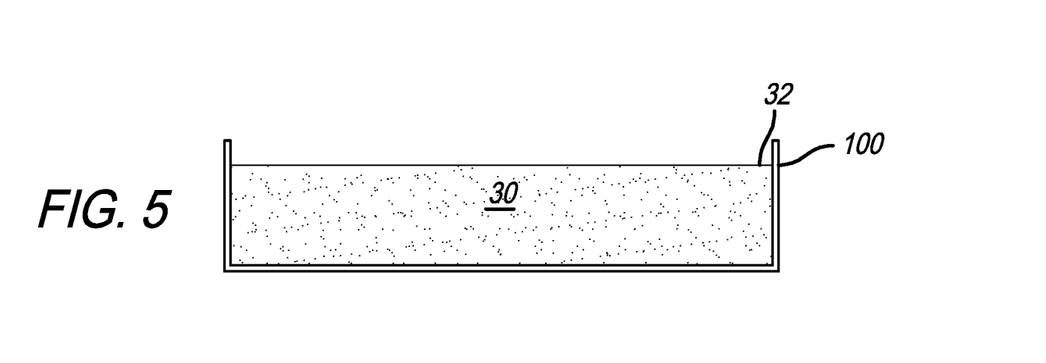
FIG. 5. shows the container with a liquid foaming adhesive therein.
Figure 6:
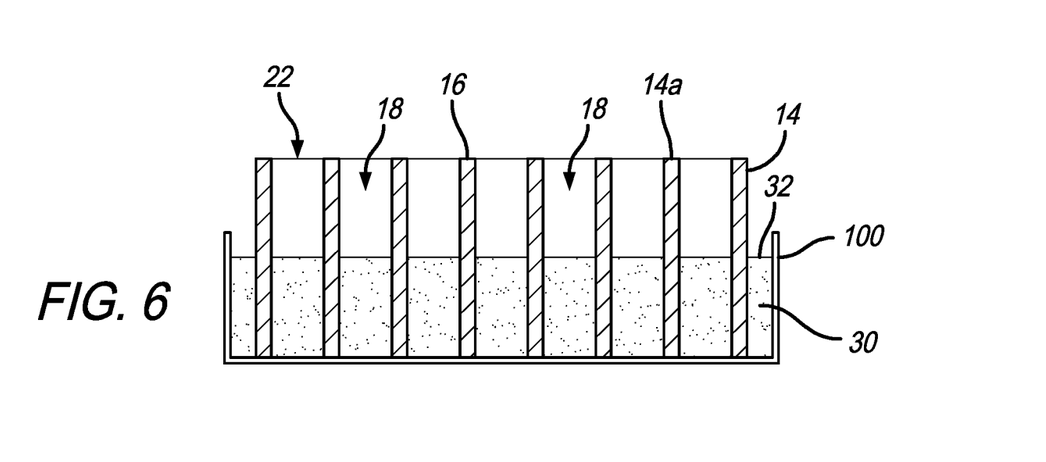
FIG. 6 shows the honeycomb core in cross-section and placed in the liquid foaming adhesive.

The process for creating the honeycomb core assembly 10 will now be described and is shown in FIGS. 4-15. FIG. 4. shows an empty container 100 used in the process for producing the honeycomb core assembly 10. Any container, vessel or the like in which a bath of liquid can be used and is within the scope of the present invention. Next a bath of liquid foaming adhesive 30 is placed in the container 100, as shown in FIG. 5. The liquid foaming adhesive 30 has a top surface 32. The honeycomb core 14 is then inserted into the bath of liquid foaming adhesive 30, as shown in FIG. 6. The honeycomb core 14 includes a top surface 14*a* that is positioned above the top surface 32 of the liquid foaming adhesive 30. In a preferred embodiment, the liquid foaming adhesive 30 includes a noise suppressing chemical therein. The noise suppressing chemical(s) can be added to the liquid foaming adhesive prior to or after insertion into the container. In another embodiment, the noise suppression chemical(s) can be omitted as the foaming adhesive already has noise suppressing qualities. The noise suppressing chemical can be, for example, ferrous-silicon alloy powder, ferrous-silicon-aluminum alloy powder, ferrite, titanium oxide, calcium titanium oxide, strontium titanate powder, and/or sendust. In another embodiment, the honeycomb core can be coated with or dipped in the noise suppressing chemical either before or after the barrier member formation.

Figure 7:
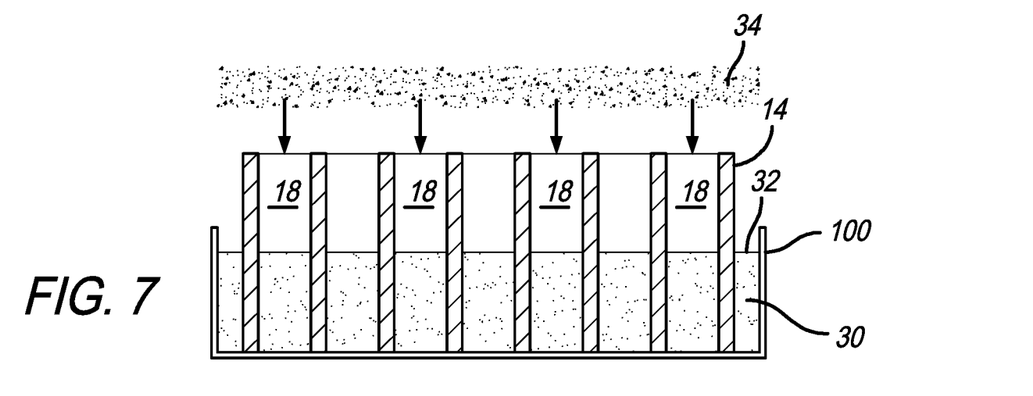
FIG. 7 shows the hardening agent and catalyst being placed in the honeycomb core.
Figure 8:
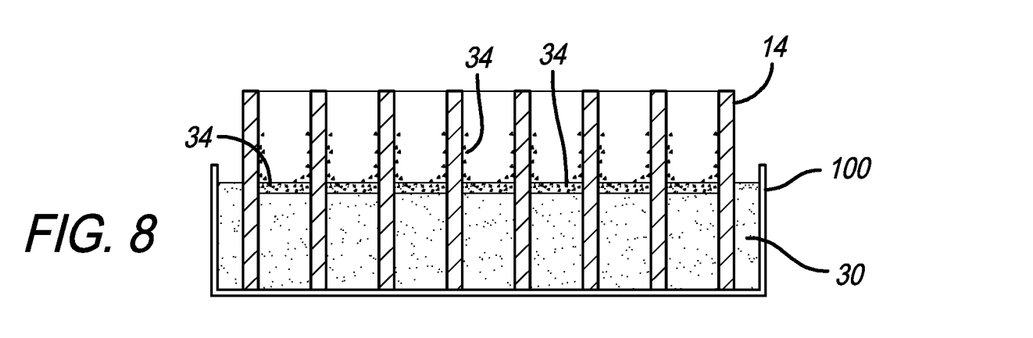
FIG. 8 shows a layer of the hardening agent and catalyst forming on and beginning to mix with the liquid foaming adhesive.
Figure 9:
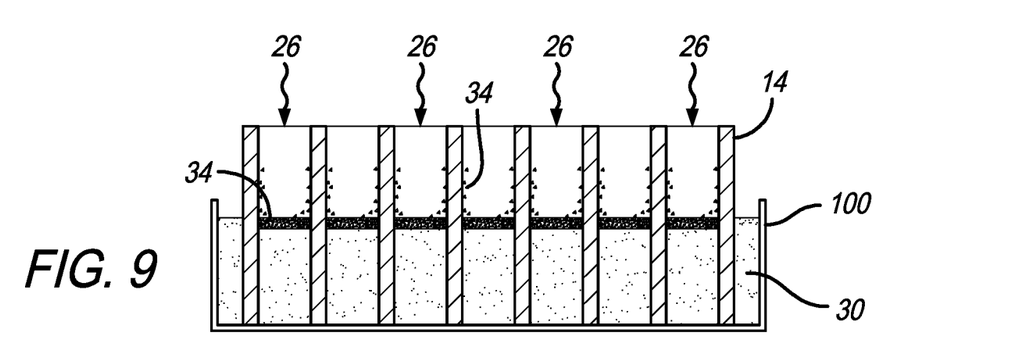
FIG. 9 shows heat being applied to the hardening agent, catalyst and liquid foaming adhesive.

Next, a mixture of a hardening agent and a catalyst/activator is added to the liquid foaming adhesive. As shown in FIG. 7, in a preferred embodiment, the hardening agent and catalyst mixture 34 is sprinkled over or otherwise inserted from the top of the honeycomb core 14 so that it settles on the top surface 32 of the liquid foaming adhesive 30 and into each of the individual cells 16 of the honeycomb core 14. This can be done by an insertion process with a plurality of individual injectors for each cell or any other process, provided each cell includes the proper mixture to complete the process described herein. After mixing with the liquid foaming adhesive, the hardening agent and catalyst mixture 34 begin to cross-link and harden, as shown in FIG. 8. In a preferred embodiment, heat 26 can be added to the process, as shown in FIG. 9 (see the wavy arrows) to either cause or speed up the hardening process. With heat application, the thermoset chemicals/resins (e.g., phenolic or benzoxazine resin) are homopolymerized with heat application after reaching a certain temperature. One part epoxy/thermoset resin or premixed epoxy/thermoset resin containing catalyst/hardener in the formula start cross-linking after reaching a certain reacting temperature to form the solid structure (the barrier member 12). Specially formulated one component epoxy systems feature outstanding performance properties, long-term durability and easy application. The curing mechanisms of one part epoxy systems include latent curing agents blended into an epoxy resin single component formula so that shelf life stability is maintained before heat activation at specified temperature. Most one part systems require a temperature of 125° C. to 150° C. for curing. They fall into three categories based on temperature and curing time: conventional, fast and snap curing. Low temperature heat cure is done at about 80° to 100° C. B-staged epoxy systems have been partially cured and are solid at room temperature. They can be liquefied and fully cured at higher temperatures. UV light curing epoxies can also be used. For UV light curing epoxies, the reaction is activated by a suitable light source at the proper intensity and wavelength. This type of systems offers fast cure speeds and lower energy consumption. Dual cure, UV and heat, can also be used. Premixed and frozen epoxies are thoroughly blended two component systems that are packaged in single part cartridges or syringes. These systems cure at room temperatures and can be used in a situation where heat is not needed.

Adhesives or resins from different manufacturers can be used, e.g., 3M, Huntsman, Henkel, Hexcel or Magnolia. Exemplary foaming adhesives that can be used are Scotch-weld 2214 (3M), Scotch-Weld 2290 (3M), Fastbond adhesives (3M), ES562 (Permabond), and EP3HTMed (MasterBond).

If the chemical itself starts polymerizing or cross-linking with the heat application after a temperature, then it does not require any catalyst. It will only requires either a catalyst or a hardener, if the polymerization/cross-linking temperature is too high and needs to be brought down by using a catalyst/hardener.

Some chemicals do not start polymerizing or cross-linking by themselves. These chemicals need a catalyst or hardener to start the reaction. For example—two part epoxy resin where one part is epoxy resin and another part is catalyst which helps to initiate the reaction, e.g., DP100 (3M), DP610 (3M). Sometimes, if heating is not adequate, the resin requires catalyst to start polymerizing, or vice-versa. There both applications of heat and catalyst are required to forming solid film.

Figure 10:
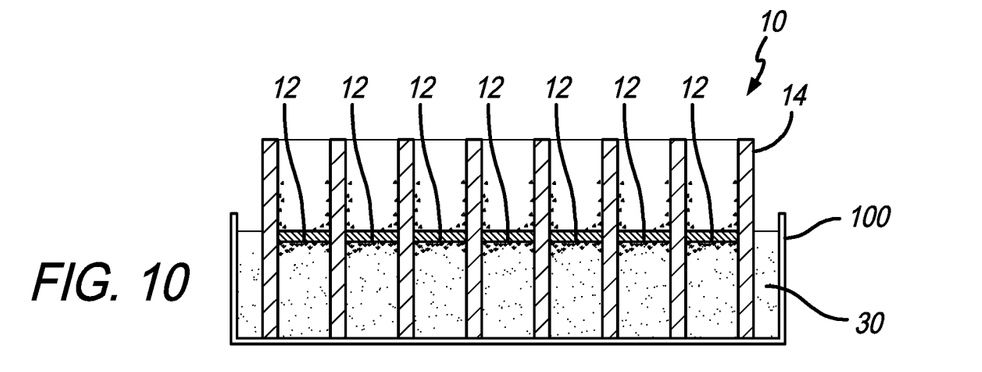
FIG. 10 shows the formation of the barrier member.
Figure 11:
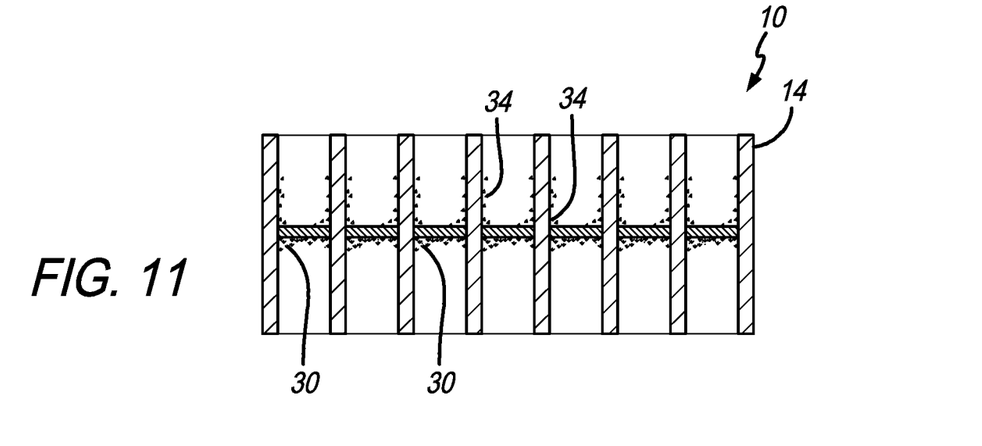
FIG. 11 shows the honeycomb core assembly after removal from the liquid foaming adhesive bath.

It will be appreciated that the thickness of the resulting barrier member(s) 12 can be controlled based on the choice of materials (i.e., catalyst, hardening agent, foaming adhesive), the length of time, the amount of heat and the length of time of heat application. FIG. 10 shows the formation of the barrier member 12 after the desired amount of time and heat has elapsed and been applied and FIG. 11 shows the honeycomb core assembly 10 after it has been removed from the liquid foaming adhesive bath. At this point in the process the honeycomb core assembly 10 has been produced.

Figure 12:
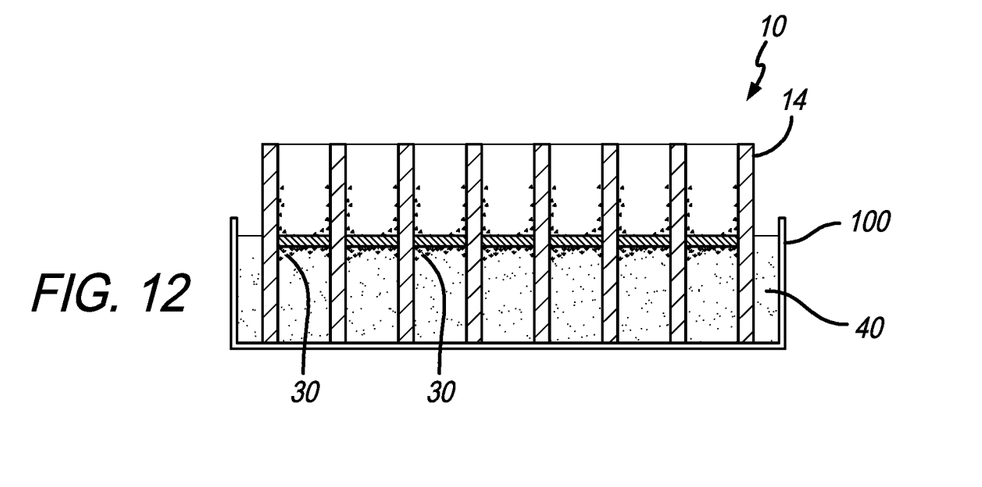
FIG. 12 shows the honeycomb core assembly inserted into a water bath to remove the excess foaming adhesive.
Figure 13:
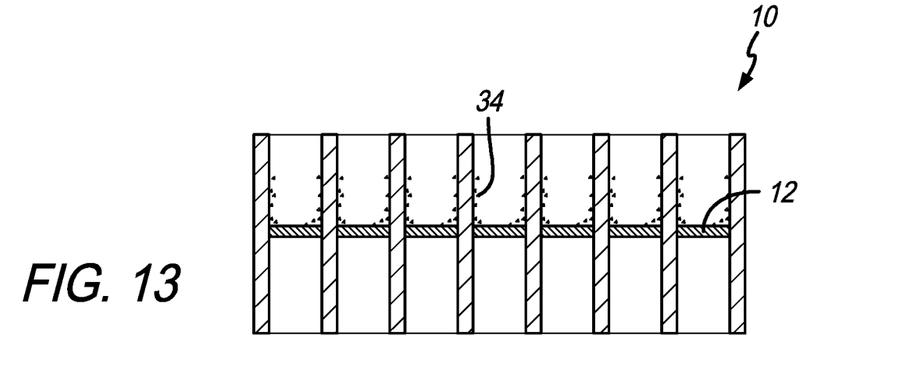
FIG. 13 shows the honeycomb core assembly after removal from the water bath.
Figure 14:
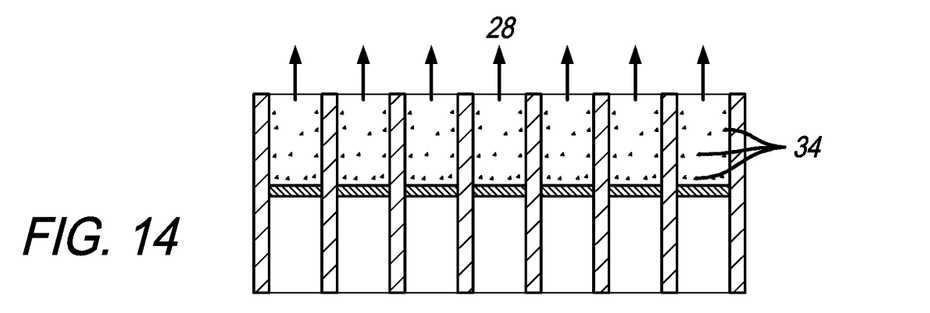
FIG. 14 shows a vacuum being applied to the honeycomb core assembly to remove excess catalyst and hardener.
Figure 15:
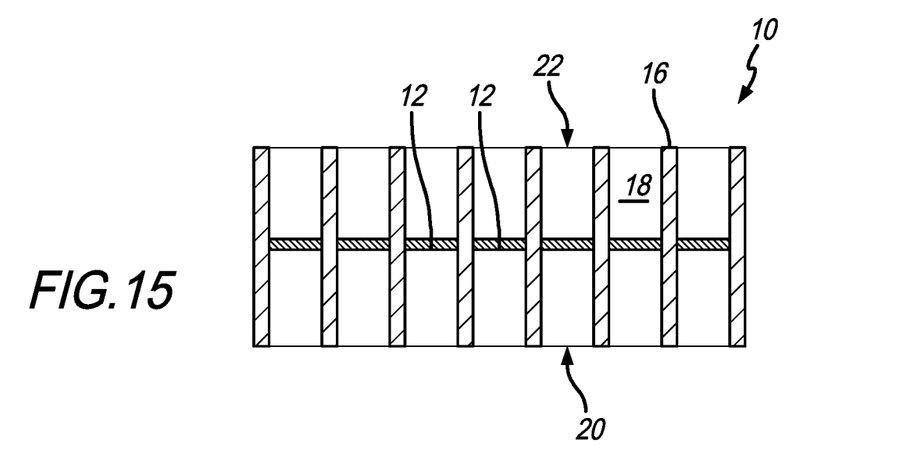
FIG. 15 shows the completed honeycomb core assembly in cross-section.

FIGS. 12-15 show a portion of the process where the honeycomb core assembly is "cleaned up" to remove any residue and materials left over from the portion of the process already described. Any method for removing any excess foaming adhesive 30 or catalyst, hardening agent mixture 34 is within the scope of the present invention. FIG. 12 shows the honeycomb core assembly inserted into a water bath 40 to remove the excess foaming adhesive. The water bath can be placed in the same container as the liquid foaming adhesive bath or a different container. In another embodiment, the water can be sprayed on or otherwise contacted with the foaming adhesive 30 for removal. In another embodiment, another liquid, fluid or agent can be used for removing the excess foaming adhesive. FIG. 13 shows the honeycomb core assembly after removal from the water bath. FIG. 14 shows a vacuum 28 (note the arrows) being applied to the honeycomb core assembly to remove excess catalyst and hardening agent mixture 34. In another embodiment, another fluid, liquid or agent can be used for removing the excess catalyst and hardening agent mixture 34. FIG. 15 shows the final or completed honeycomb core assembly after removal of the residue and excess materials.

Figure 16A:
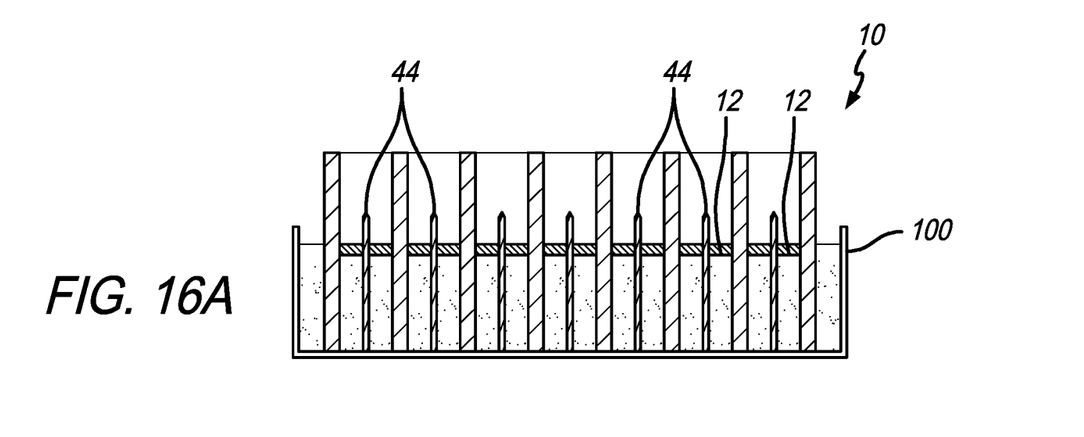
FIG. 16A shows the formation of the barrier member during a process that includes perforation members.
Figure 16B:
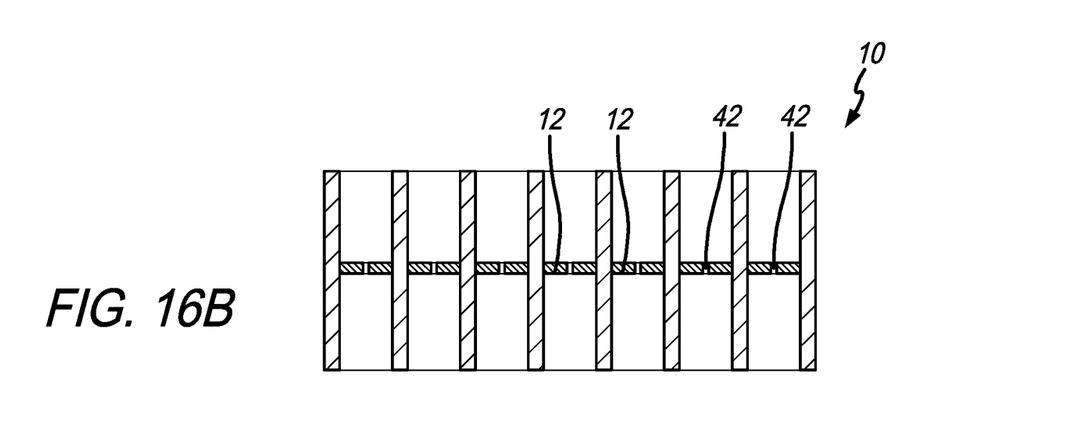
FIG. 16B shows the completed honeycomb core assembly in cross-section with perforations through the barrier members.

FIGS. 16A and 16B show portions of another process for forming a honeycomb core assembly 10 that includes perforations 42 in the barrier members 12. As shown in FIG. 16A, in a preferred embodiment, the container 100 includes a plurality of perforation members 44 (nails, needles, rods, etc.) extending upwardly above the top surface 32. The perforation members 44 are arranged so that a desired number (one or more) are positioned in each of the cells 16 when the honeycomb core 10 is placed in the bath. FIG. 16A shows a single perforation member 44 in each cell 16. Therefore, after curing of the foaming adhesive, catalyst, hardening agent mixture and formation of the barrier member 12, a perforation 42 remains in each barrier member 12. FIG. 16B shows the honeycomb core assembly 10 after removal from the bath and the removal of any residue, as discussed above. In another embodiment, the perforations can be created by using a tool to punch the perforations, lasers or needles can also be used. For example, a machine can be used to insert the perforation members into the cells to perforate the barrier member and form the perforation.

In another embodiment, each or several cells can include multiple barrier members (vertically spaced from one another, as oriented in the drawings). The multiple barrier members can be added by performing the process more than once with liquid foaming adhesive baths with top surfaces at different levels.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method for providing a honeycomb core assembly, the method comprising the steps of:
   (a) obtaining a honeycomb core that includes at least first and second cells that each define a cell interior having an open bottom and an open top,
   (b) inserting the honeycomb core into a bath of liquid foaming adhesive, wherein the liquid foaming adhesive has a top surface that is located below a top surface of the honeycomb core,
   (c) after step (b), disposing a hardening agent into the cell interiors of the first and second cells and on the top surface of the liquid foaming adhesive, and
   (d) allowing the hardening agent and liquid foaming adhesive to react to harden and form a first barrier member that spans the cell interior of the first cell and a second barrier member that spans the cell interior of the second cell, thereby forming the honeycomb core assembly.

2. The method of claim 1 further comprising a step of mixing a catalyst with the hardening agent and/or applying heat to the hardening agent and liquid foaming adhesive.

3. The method of claim 1 wherein step (c) includes contacting a mixture of a hardening agent and a catalyst with the liquid foaming adhesive to provide a mixture of the hardening agent, catalyst and liquid foaming adhesive.

4. The method of claim 3 further comprising a step of applying heat to the mixture of the hardening agent, catalyst and liquid foaming adhesive.

5. The method of claim 3 further comprising a step of applying a vacuum through the open tops of the first and second cells to remove any excess catalyst and hardening agent within their cell interiors.

6. The method of claim 1 wherein the liquid foaming adhesive includes a noise suppressing chemical therein.

7. The method of claim 6 wherein the noise suppressing chemical is chosen from the group consisting of ferrous-silicon alloy powder, ferrous-silicon-aluminum alloy powder, ferrite, titanium oxide, calcium titanium oxide, strontium titanate powder, and sendust.

8. The method of claim 1 further comprising a step of forming at least one perforation in the first barrier member and forming at least one perforation in the second barrier member.

9. The method of claim 1 further comprising steps of positioning at least first and second perforating members in the bath of liquid foaming adhesive, wherein the first and second perforating members extend upwardly above the top surface of the liquid foaming adhesive, wherein after the honeycomb core is inserted into the bath of liquid foaming adhesive, the first perforating member is located in the cell interior of the first cell and the second perforating member is located in the cell interior of the second cell.

10. The method of claim 9 wherein the first perforating member forms a first perforation in the first barrier member and the second perforating member forms a second perforation in the second barrier member during step (d).

11. A method for providing a honeycomb core assembly, the method comprising the steps of:
(a) obtaining a honeycomb core that includes at least first and second cells that each define a cell interior having an open bottom and an open top,
(b) contacting the honeycomb core with a liquid foaming adhesive,
(c) contacting a hardening agent with the liquid foaming adhesive,
(d) allowing the hardening agent and liquid foaming adhesive to react to harden and form a first barrier member that spans the cell interior of the first cell and a second barrier member that spans the cell interior of the second cell, thereby forming the honeycomb core assembly, and
(e) inserting the honeycomb core assembly into a water bath to remove any foaming adhesive residue under the first and second barrier members.

12. A method for providing a honeycomb core assembly, the method comprising the steps of:
(a) obtaining a honeycomb core that includes at least first and second cells that each define a cell interior having an open bottom and an open top,
(b) contacting the honeycomb core with a liquid foaming adhesive,
(c) contacting a hardening agent with the liquid foaming adhesive,
(d) allowing the hardening agent and liquid foaming adhesive to react to harden and form a first barrier member that spans the cell interior of the first cell and a second barrier member that spans the cell interior of the second cell, thereby forming the honeycomb core assembly, and
(e) coating the honeycomb core with a noise suppressing chemical prior to step (b).

13. A method for providing a honeycomb core assembly, the method comprising the steps of:
(a) obtaining a honeycomb core that includes at least first and second cells that each define a cell interior having an open bottom and an open top,
(b) inserting the honeycomb core into a bath of liquid foaming adhesive, wherein the liquid foaming adhesive has a top surface that is located below a top surface of the honeycomb core, and wherein the liquid foaming adhesive includes a noise suppressing chemical therein,
(c) disposing a hardening agent into the cell interiors of the first and second cells and on the top surface of the bath of liquid foaming adhesive,
(d) applying heat to the hardening agent and liquid foaming adhesive,
(e) allowing the hardening agent and liquid foaming adhesive to react to harden and form a first barrier member that spans the cell interior of the first cell and a second barrier member that spans the cell interior of the second cell, thereby forming the honeycomb core assembly,
(f) removing the honeycomb core assembly from the bath of liquid foaming adhesive, and
(g) inserting the honeycomb core assembly into a water bath to remove any foaming adhesive residue under the first and second barrier members.

14. The method of claim 13 further comprising steps of positioning at least first and second perforating members in the bath of liquid foaming adhesive, wherein the first and second perforating members extend upwardly above the top surface of the liquid foaming adhesive, wherein after the honeycomb core is inserted into the bath of liquid foaming adhesive, the first perforating member is located in the cell interior of the first cell and the second perforating member is located in the cell interior of the second cell.

15. The method of claim 14 wherein the first perforating member forms a first perforation in the first barrier member and the second perforating member forms a second perforation in the second barrier member during step (e).

* * * * *